June 5, 1923.
M. LOUGHEAD
1,457,781
NONEXPANSIVE HOSE AND METHOD OF MAKING SAME
Filed Nov. 15, 1922
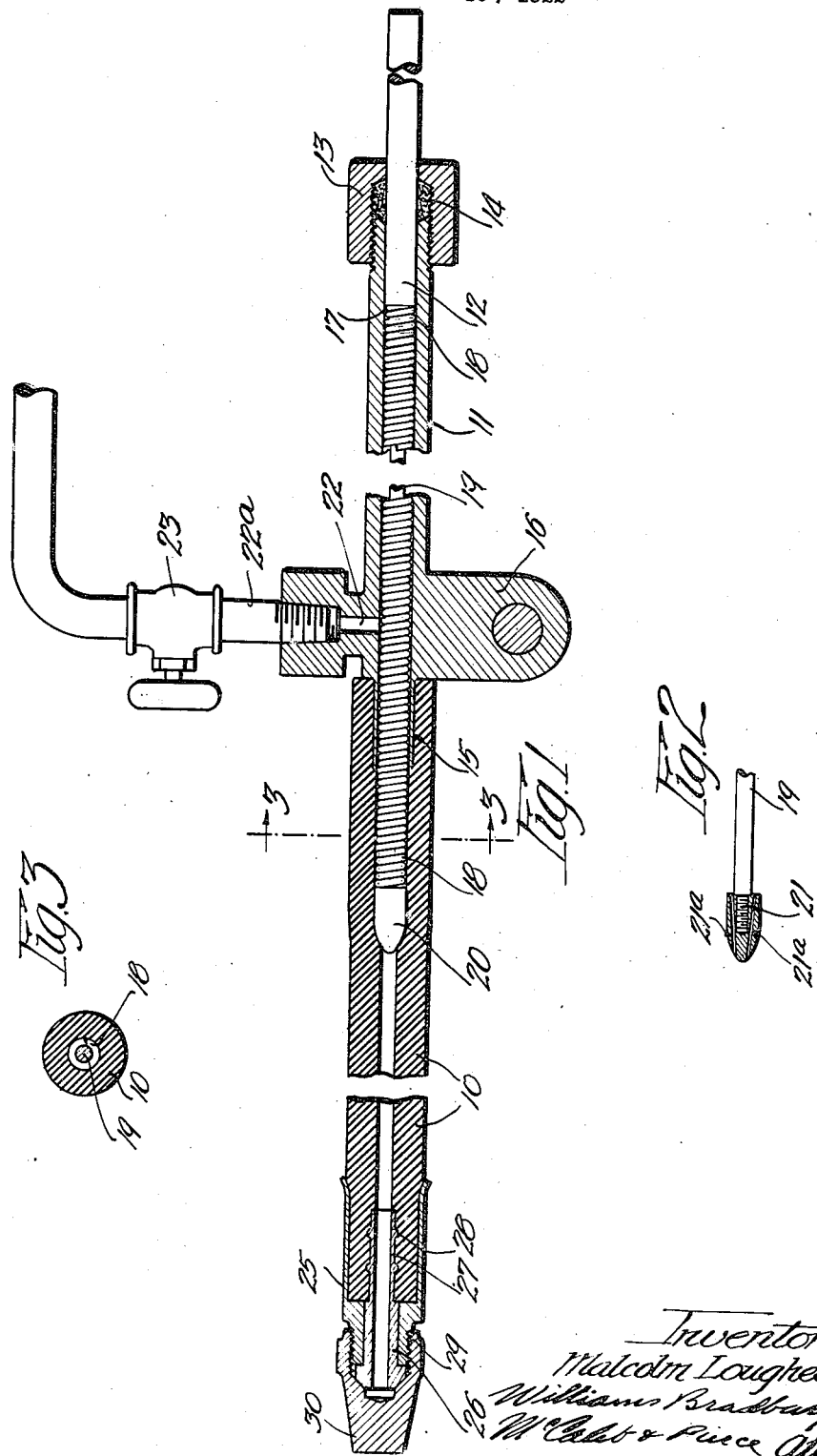

Patented June 5, 1923.

1,457,781

UNITED STATES PATENT OFFICE.

MALCOLM LOUGHEAD, OF DETROIT, MICHIGAN, ASSIGNOR TO FOUR WHEEL HYDRAULIC BRAKE COMPANY, OF LOS ANGELES, CALIFORNIA, A CORPORATION OF CALIFORNIA.

NONEXPANSIVE HOSE AND METHOD OF MAKING SAME.

Application filed November 15, 1922. Serial No. 601,019.

*To all whom it may concern:*

Be it known that I, MALCOLM LOUGHEAD, a citizen of the United States, and resident of Detroit, in the county of Wayne and State of Michigan, have invented certain new and useful Improvements in Nonexpansive Hose and Methods of Making Same, of which the following is a full, clear, concise, and exact description, reference being had to the accompanying drawings, forming a part of this specification.

This invention relates to flexible hose of the type which is used in conveying the fluid in fluid-operated braking systems for vehicles, and also to the method of making hose of this character.

The object of the invention is to provide a flexible hose for conveying the fluid to the braking cylinders in fluid-operated brake systems, which will not expand appreciably when subjected to pressures ordinarily employed in braking systems.

One of the features of the invention is a flexible hose within the internal bore of which is a coil of wire, as a coil spring, which is inserted in the hose while the hose is subjected to considerable internal pressure, and which is firmly engaged by the inner surface of the hose under normal circumstances.

Another feature of the invention is the instrument and method employed for inserting the spiral wire within the bore of the hose.

Other features and advantages will appear during the progress of the description.

When a flexible hose of fabric or similar material is subjected to high internal pressure, the hose expands considerably, due to the elasticity of the materials employed. This characteristic of the flexible hose is very undesirable when employed for conducting the fluid to the brake operating cylinders in a fluid-operated braking system, as it results in materially slowing down the operation of the brakes.

However, if the hose can be subjected to high internal pressure, and while this pressure is maintained, a flexible relatively incompressible tube is snugly inserted therein, the hose upon reduction of the pressure will firmly engage the outer surface of the tube and will be maintained in its expanded condition. Therefore, if the hose is later subjected to a pressure somewhat lower than that employed while inserting the incompressible tube within the hose, it will expand relatively very little.

The present invention contemplates the insertion within the hose of a tube consisting, according to the present embodiment of the invention, of a coiled spring while the air or other fluid within the hose is subjected to a high pressure, say, of approximately two thousand pounds. It, therefore, will be obvious that if the coiled spring is snugly inserted within the hose while the hose is subjected to this high pressure, that the hose will be practically non-expansive at lower pressures which are ordinarily employed in fluid-operated braking systems.

It is believed that further description of the invention will be best understood by a detailed description thereof taken in connection with the accompanying drawings, in which—

Figure 1 is a section through a portion of a hose in which the spiral wire is being inserted, and the instrument employed for inserting the spiral wire or spring within the hose;

Figure 2 is a section through a portion of the plunger and the tip at the end thereof, and Figure 3 is a section on the line 3—3 of Figure 1.

Referring now to the drawings, in which like characters of reference indicate like parts in the several views, 10 indicates a hose of fabric construction, the only requirement being that the hose must be capable of withstanding great internal pressure, preferably well above two thousand pounds. For inserting the spiral wire or spring within the hose, a tool is provided which consists of the cylindrical portion 11 within which the plunger 12 is slidable. The cylinder 11 at one end is screw threaded, and the screw threaded cap member 13 co-operates with the screw threads at the end of the member 11, packing material 14 being provided between the end of the cylinder 11 and the inturned flanges on the member 13. This structure provides a stuffing box through which the plunger 12 is reciprocable. The cylinder 11, at its end remote from the cap 13, is provided with a nipple 15 adapted to be received in one end of the hose 10. If necessary, a clamping band of any desired character may be employed to firmly secure the end of the hose on the nipple 15. Integral with the cylinder 11 is the outwardly extending perforated lug 16, which may be employed in an obvious manner to anchor the cylinder 11.

The plunger 12 is shouldered, as indicated at 17, and the spiral wire or spring 18 is adapted to be placed upon the reduced portion 19 of the plunger. The reduced portion 19 is provided at its end with an enlarged head or tip member 20, which is screw threaded onto the threaded portion 21 of the plunger. Communicating with the bore of the cylinder 11 is an opening 22 with which is joined the tube 22$^a$, extending to a source of fluid under pressure, a valve 23 being provided in the tube 22$^a$.

For closing one end of the hose, the arrangement shown at the left in Figure 1 is provided. This consists of the shouldered collar 25 adapted to snugly engage the outer surface of one end of the hose. Slidably received by the shouldered portion of the member 25 is a tubular member 26 provided with the nipple 27 adapted to be inserted within the bore of the hose 10 at the end thereof. The nipple 27 is provided with a plurality of circumferential ridges 28 to cause it to more securely engage the inner surface of the hose.

Arranged for screw threaded engagement with the threads 29, at the end of the collar 25, is a cap member 30. In applying the device to the end of the hose, the collar 25 will first be inserted on the end of the hose, and the nipple 27 will then be inserted within the hose for a portion of its length. The threads on the inner surface of the member 30 will then be engaged with the threads on the portion 29 of collar 25, when, by turning the member 30 home, the nipple 27 is forced entirely within the bore of the hose 10, and the hose is firmly clamped between the nipple 27 and the collar 25, thus completely closing the end of the hose. If found necessary or desirable, the threaded portions of the member 25 and cap member 30 may be increased in length in order that the cap member 30 may be employed to force the nipple 27 for practically its whole length into the bore of the hose.

The manner of employing the instrument disclosed in Figure 1 in inserting the coil within the bore of the hose is as follows:

The plunger 12 will be moved toward the left through the cylinder 11 until the shoulder 17 is adjacent to the stuffing box. The head member 20 being removed from the end of the plunger, the spring 18 is then inserted on the reduced portion 19 of the plunger, and the head member 20 is then replaced in position at the end of the reduced portion 19. The spring 18 will preferably be of such a length as to substantially fit between the shoulder 17 and the head member 20. The parts will preferably be so constructed that after the spring has been placed on the plunger and the head member 20 screwed in place, the plunger may be moved slightly to the right, as shown in Figure 1, so as to be practically entirely withdrawn into the cylinder 11 and nipple 15.

The hose closing device shown at the left in Figure 1 having been applied to one end of the hose, the other end of the hose is inserted over the nipple 15 and secured in position in any desired manner. As the tube 22 communicates with a source of fluid under pressure, it is obvious that if the valve 23 is now opened, the fluid under pressure, such as air or other medium, will flow into the cylinder 11, and as the right end thereof is closed through the medium of the stuffing box, it will find exit through the openings 21$^a$ in the head or tip 20, and also around the tip and into the bore of the hose 10. The fluid used for this purpose will be under a comparatively high pressure, preferably about two thousand pounds per square inch. As a result of subjecting the hose to an internal pressure of substantially two thousand pounds, the hose will be considerably expanded, permitting the plunger with the coil spring 18 thereon to be forced to the left, from the position in Figure 1, until the head 20 engages the nipple 27, thus resulting in placing the coil spring 18 within the bore of the hose. The valve 23 will now be operated to cut off communication with the source of pressure. The cap member 30 will be removed, and the cylindrical member 26 and collar 25 removed from the end of the hose. The end of the hose may now be cut off, the head member 20 removed from the plunger, and the plunger withdrawn from the center of the spring 18. The opposite end of the hose will, of course, be removed from the nipple 15.

The spring 18 having been snugly inserted within the hose while it was subjected to a very high internal pressure, upon removal of the pressure, the hose will contract into firm engagement with the outside of the tube formed by the coil spring. Thus, as the pressure ordinarily employed in the fluid pressure operated brake systems is considerably less than two thousand pounds (usually not over 1500 pounds per square inch), when the hose is employed for carrying the fluid to the brake cylinders, it will not appreciably expand when the pressure within the braking system is increased to set the brakes, due to the fact that the hose is maintained in its expanded condition by the coil of wire within it. This is very desirable in braking systems, as the expansibility of the flexible hose or tubing commonly employed acts to considerably retard the operation of applying the brakes in a fluid-pressure operated braking system.

Although in the accompanying drawings and in the above description, the tube inserted within the hose is shown and described as a coil of wire, it is to be understood that the flexible tube inserted within the hose may be of other formation, it merely being necessary that it shall be flexible and practically incompressible in character.

It is also obvious that many modifications may be made in the details of the device for inserting the incompressible tube within the hose, without departing from the spirit of applicant's invention. It is, therefore, to be understood that the invention is to be limited merely by the scope of the appended claims.

Having thus described my invention, what I claim is new and desire to secure by Letters Patent of the United States is:

1. In a hose for fluid operating braking systems, a flexible hose of fabric or similar construction, and a flexible relatively incompressible tube positioned within the bore of said hose and forcibly engaging the inner surface thereof so as to render the hose relatively non-expansive at pressures ordinarily employed in braking systems.

1. In a hose for fluid operated braking systems, a flexible hose of fabric or similar construction, and a tube of spirally arranged wire positioned within the bore of said hose and forcibly engaging the inner surface thereof so as to render the hose relatively non-expansive at pressures ordinarily employed in braking systems.

3. In a hose for fluid operated braking systems, a flexible hose of fabric or similar construction, and a spiral spring positioned within the bore of said hose and forcibly engaging the inner surface thereof so as to render the hose relatively non-expansive at pressures ordinarily employed in braking systems.

4. The method of rendering a hose substantially non-expansive at pressures ordinarily employed in braking systems, which consists in subjecting the hose to a high internal pressure, and snugly inserting a flexible relatively incompressible tube within the hose while subjected to the internal pressure.

5. The method of rendering a hose substantially non-expansive at pressures ordinarily employed in braking systems which consists in subjecting the hose to a high internal pressure to expand the hose, and snugly inserting a tube of spirally arranged wire within the hose while subjected to internal pressure.

6. The method of rendering a hose substantially non-expansive at pressures ordinarily employed in braking systems, which consists in expanding the hose by forcing a fluid under high pressure therein, and snugly inserting a flexible relatively incompressible tube within the hose while subjected to internal pressure.

7. The method of rendering a hose substantially non-expansive at ordinary pressures, which consists in expanding the hose by forcing gas under high pressure therein, and snugly inserting a spiral spring within the hose while subjected to internal pressure.

8. The method of rendering a hose substantially non-expansive, which consists in placing the fluid within the hose under high pressure, and inserting a tube of spirally arranged wire within the hose while maintaining the pressure therein.

9. In a tool of the class described, a cylinder, a plunger slidable within said cylinder, a stuffing box at one end of said cylinder through which said plunger extends, and a nipple at the other end of said cylinder adapted to be received within the bore of a flexible hose.

10. In a tool of the class described, a cylinder, a plunger slidable within said cylinder, a stuffing box at one end of said cylinder through which said plunger extends, a nipple at the other end of said cylinder adapted to be received within the bore of a flexible hose, and a tube communicating with said cylinder adapted to be joined to a source of fluid under pressure.

11. In a tool of the class described, a cylinder, a plunger slidable within said cylinder, a reduced portion on said plunger adapted to receive a flexible relatively non-compressible metallic tube thereon, a stuffing box at one end of said cylinder through which said plunger extends, and a nipple at the other end of said cylinder adapted to be received within the bore of a flexible hose.

12. In a tool of the class described, a cylinder, a plunger slidable within said cylinder, a reduced portion on said plunger adapted to receive a flexible relatively non-compressible metallic tube thereon, a stuffing box at one end of said cylinder through which said plunger extends, a nipple at the other end of said cylinder adapted to be received within the bore of a flexible hose, and a tube communicating with said cylinder adapted to be joined to a source of fluid under pressure.

13. In a tool of the class described, a cylinder, a plunger slidable within said cylinder, a reduced portion on said plunger adapted to receive a spiral spring, a removable tapered tip at the end of said plunger having an outside diameter substantially equal to the outside diameter of said spring, a stuffing box at one end of said cylinder through which said plunger extends, and a nipple at the other end of said cylinder adapted to be received within the bore of a flexible hose.

14. In a tool of the class described, a cylinder, a plunger slidable within said cylinder, a reduced portion on said plunger adapted to receive a spiral spring, a removable tapered tip at the end of said plunger having an outside diameter substantially equal to the outside diameter of said spring, a stuffing box at one end of said cylinder through which said plunger extends, a nipple at the other end of said cylinder adapted to be received within the bore of a flexible hose, and a tube communicating with said cylinder adapted to be joined to a source of fluid under pressure.

15. In a tool of the class described, a cylinder, a plunger slidable within said cylinder, a stuffing box at one end of said cylinder through which said plunger extends, and means for joining the other end of said cylinder to a flexible hose with the bores of said cylinder and hose substantially in alignment.

16. In a tool of the class described, a cylinder, a plunger slidable within said cylinder, a reduced portion on said plunger adapted to receive a flexible relatively non-compressible metallic tube thereon, a stuffing box at one end of said cylinder through which said plunger extends, and means for joining the other end of said cylinder to a flexible hose with the bores of said cylinder and hose substantially in alignment.

17. In a tool of the class described, a cylinder, a plunger slidable within said cylinder, a reduced portion on said plunger adapted to receive a spiral spring, a removable tapered tip at the end of said plunger having an outside diameter substantially equal to the outside diameter of said spring, a stuffing box at one end of said cylinder through which said plunger extends, means for joining the other end of said cylinder to a flexible hose, and a tube communicating with said cylinder adapted to be joined to a source of fluid under pressure.

In witness whereof, I hereunto subscribe my name this 1st day of November, 1922.

MALCOLM LOUGHEAD.

Witnesses:
C. L. SNYDER,
D. O. SCOTT.